Patented Aug. 11, 1931

1,818,049

UNITED STATES PATENT OFFICE

KARL DOBMAIER, OF WIESDORF, GERMANY, ASSIGNOR TO GENERAL ANILINE WORKS, INC., OF NEW YORK, N. Y., A CORPORATION OF DELAWARE

NEW AZODYESTUFF

No Drawing. Application filed August 9, 1928, Serial No. 298,619, and in Germany August 19, 1927.

The present invention relates to a new dyestuff of the formula:

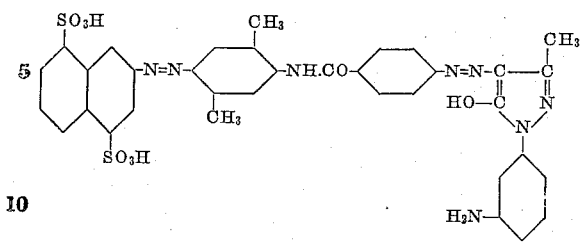

The following example serves to illustrate my invention:

*Example.*—54 parts by weight of 2-naphthylamino-4:8-disulfonic acid are diazotized in the customary manner and coupled with 18 parts by weight of para-xylidine in an acetic acid solution. The dyestuff formed is purified by re-dissolving and washing with dilute hydrochloric acid, made into a paste with water and condensed in a solution rendered weakly alkaline with sodium carbonate with 30 parts by weight of paranitrobenzoyl chloride which is slowly added at 60° C.

The resulting product can readily be isolated by salting out and is reduced at 60° C. in the course of 2–3 hours by means of 50 parts by weight of sodium sulfide. The intermediate product, isolated by neutralizing and salting out, is obtained in a pure form by re-dissolving done twice. After diazotizing it in the customary manner, coupling with an alkaline sodium carbonate solution of 20 parts by weight of meta aminophenylmethylpyrazolone and salting out, a yellowish brown powder is obtained (when in dry state), which in its free form probably corresponds to the formula

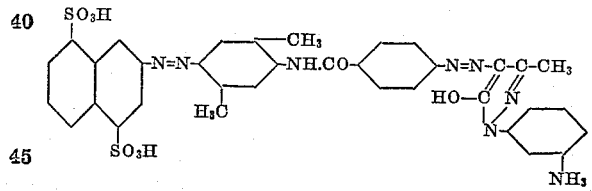

It forms a yellowish brown powder difficulty soluble in the usual organic solvents, easily soluble in water in form of its alkali metal salt, and dyes cotton a clear yellow shade. When developed on the fibre with β-naphthol a bright orange shade is obtained and with pyrazolone a clear yellow.

As developing components there may be used also for example, amino-naphthols, β-naphthol sulfonic acids, acyl- or arylaminonaphthol sulfonic acids, such as for example, 1-acetylamino-8-hydroxynaphthalene-3:6-disulfonic acid, 1-naphthol-5-sulfone-2-phenylamino-8-hydroxynaphthalene-6-sulfonic acid and the like.

I claim:—

The azo dyestuff having in its free form the probable formula

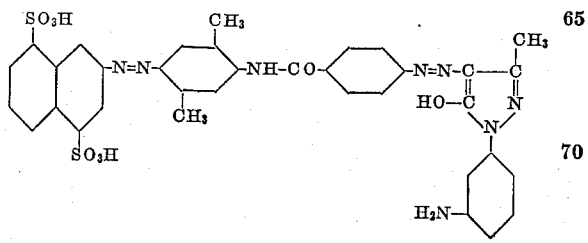

said dyestuff being a yellowish brown powder difficultly soluble in the usual organic solvents, easily soluble in water in form of its alkali metal salts, dyeing cotton a clear yellow shade and being capable of being diazotized and developed with coupling components.

In testimony whereof I have hereunto set my hand.

KARL DOBMAIER. [L. S.]